Jan. 29, 1952　　　　　G. G. HYDE　　　　　2,583,775
FORCE AMPLIFYING NUT

Filed July 2, 1948　　　　　　　　　　　　　　5 Sheets-Sheet 1

INVENTOR.
GEORGE GAYNOR HYDE
BY
ATTORNEY.

Jan. 29, 1952  G. G. HYDE  2,583,775
FORCE AMPLIFYING NUT
Filed July 2, 1948  5 Sheets-Sheet 2

INVENTOR.
GEORGE GAYNOR HYDE
BY
ATTORNEY.

Jan. 29, 1952

G. G. HYDE 2,583,775

FORCE AMPLIFYING NUT

Filed July 2, 1948

INVENTOR.

GEORGE GAYNOR HYDE

BY

ATTORNEY.

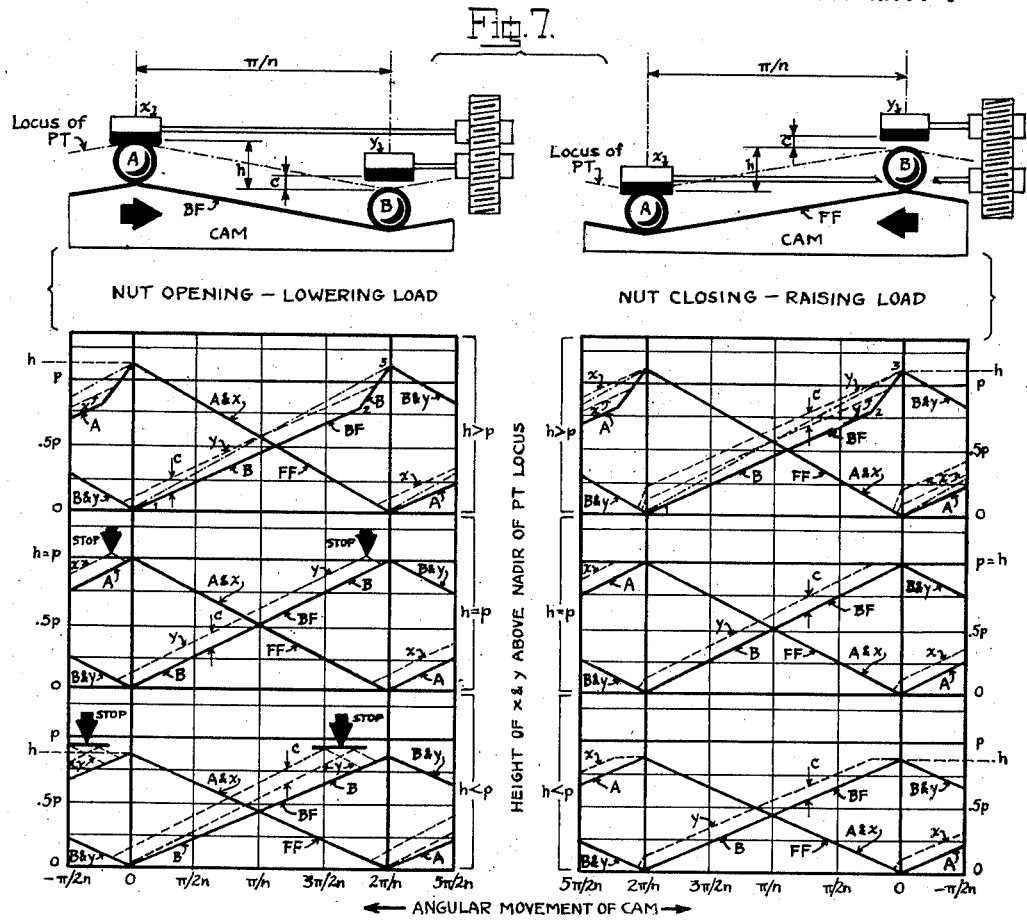
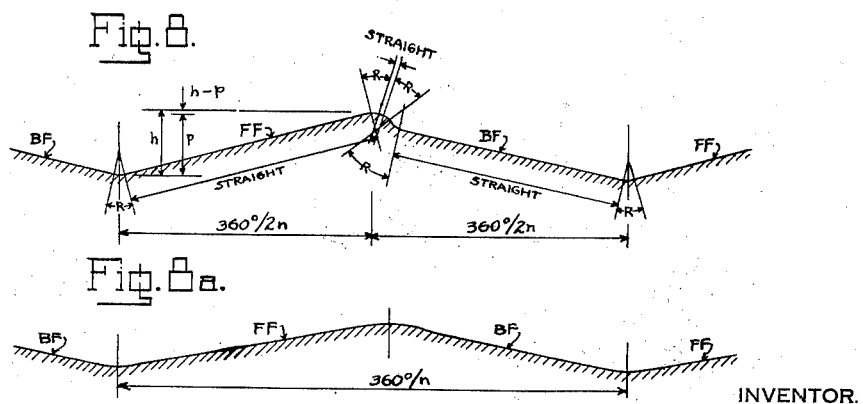

Jan. 29, 1952　　　　　G. G. HYDE　　　　　2,583,775
FORCE AMPLIFYING NUT

Filed July 2, 1948　　　　　　　　　　　　　　　5 Sheets—Sheet 5

INVENTOR.
GEORGE GAYNOR HYDE
BY
ATTORNEY.

Patented Jan. 29, 1952

2,583,775

UNITED STATES PATENT OFFICE 2,583,775

FORCE AMPLIFYING NUT

George Gaynor Hyde, Darien, Conn., assignor to Sarsal Devices, Inc., New York, N. Y., a corporation of New York Application July 2, 1948, Serial No. 36,614

6 Claims. (Cl. 74—424.8)

The present invention relates to a force amplifying nut, and has for its object the successful utilization in a nut and screw combination of the principle of rolling bearing support of a load to eliminate friction. The term nut and screw combination is used in its generic sense and contemplates a screw shaft and surrounding nut, a worm gear and pinion, as well as any mechanical combination in which interengaging pitched threads or teeth are employed. More particularly, the invention relates to devices of the character disclosed in the U. S. patent to Fiorentino No. 2,151,094 issued March 21, 1939, entitled "Device for Reducing Frictions in Systems of the Worm and Nut Type"; and the present invention aims primarily to provide improvements in such devices insuring that the operating parts thereof will not shift out of proper operative relationship to each other under operating conditions sometimes encountered in practice, as hereinafter set forth in greater detail. It is an object of the present invention, therefore, to provide a nut assembly in which the range of deformation under the maximum and minimum load for which the nut is designed, is compensated for in the cooperative relation between the nut elements, the balls and the cam member, so that the nut assembly will function properly under all conditions of load, both in its tightening and loosening directions of operation.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variation and modifications as fall within the spirit of the invention and the scope of the appended claims.

In the drawings:

Fig. 7 is a kinematic chart analysis illustrating certain principles underlying the invention.

Fig. 8 is an enlarged sectional view showing the cam profile according to one method of carrying out the invention.

Fig. 8a is a similar view showing a modified cam profile.

Figure 1:
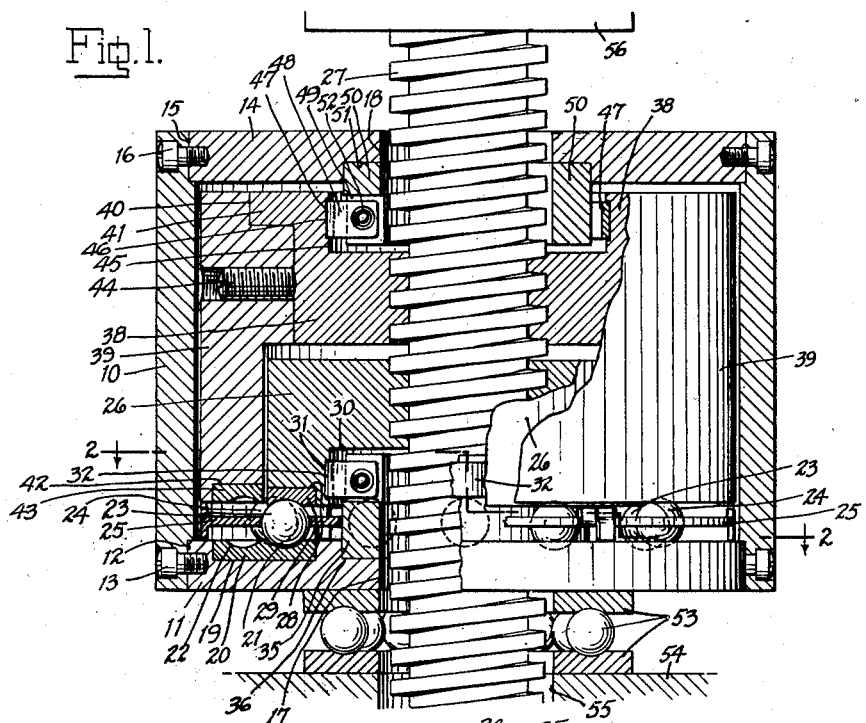
Fig. 1 is a vertical sectional view, partially in elevation, of a force amplifying nut according to one illustrated exemplary embodiment of the invention, this form of the invention being designed to apply a force in one direction, namely an upward lifting force on the screw illustrated.
Figure 2:
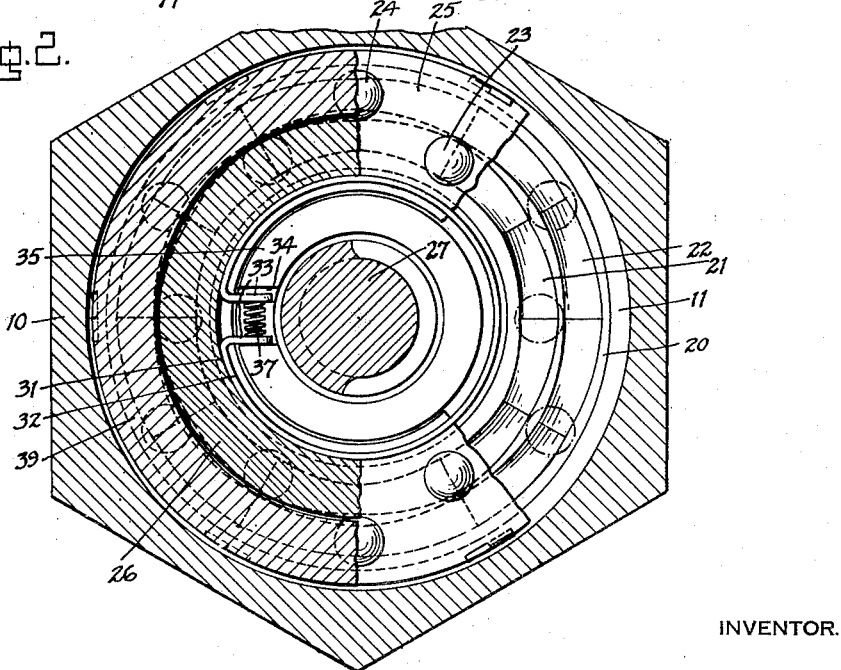
Fig. 2 is a horizontal sectional view, taken along the line 2—2 of Fig. 1.
Figure 4:
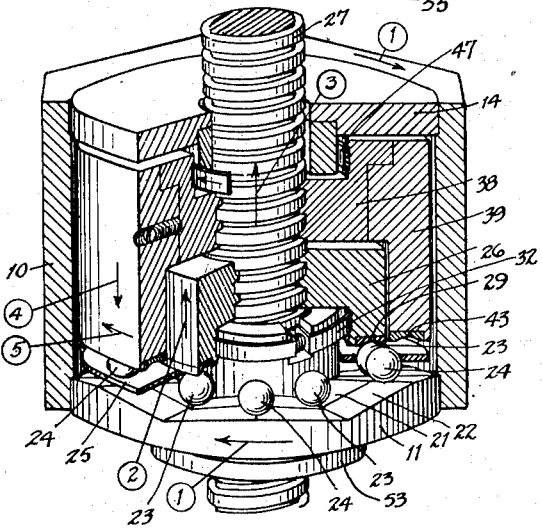
Fig. 4 is a perspective view, partially cut away, of the nut assembly of Fig. 1, the cam element being shown diagrammatically to more clearly illustrate the principle of the invention.

Referring in detail to the drawings, and particularly to Figs. 1, 2 and 4 thereof, the force amplifying nut according to the illustrated exemplary embodiment of the invention shown therein, comprises a casing 10 having a cylindrical inner wall and a hexagonal outer wall, and provided at its lower end with a circular base plate 11 set into a recess 12 of the casing and secured by screws 13, and having at its upper end a circular cover plate 14 set into a recess 15 of the casing and secured by screws 16. The plates 11 and 14 are respectively provided with central apertures 17 or 18 for receiving the screw shaft or spindle. Within an annular recess 19 of the base plate 11 there is secured a circular cam ring 20, provided with inner and outer concentric ball races 21 and 22, each provided with alternate rising and falling cam surfaces, the high points and the low points of the two races being in radial line with each other. Two sets of balls 23 and 24 are respectively engaged with the races 21 and 22, and are positioned in a ball retainer 25 which maintains the balls in concentric and angularly spaced relation to each other, the balls of the outer set being alternately arranged with respect to the balls of the inner set, so that, when the balls of the one set are resting upon the high points of one cam race, the balls of the other set are resting upon the low points of the other cam race.

The lower nut element 26 is threaded upon the screw shaft or spindle 27 which extends freely through the end openings 17 and 18 of the casing, and has secured in an annular recess 28 in its lower side a horizontal ball race member 29 disposed above the inner set of balls 23. In this form of the invention, the shaft 27 constitutes what may be termed the force applying member of the combination, i. e. the member which transmits force from the device to the load when the member 27 moves endwise in one direction, e. g. when a load is being lifted; and which member when moved in the opposite direction may transmit force from the load to the device under some operating conditions e. g. when a load is being lowered. The nut element 26 is provided in its underside at its inner periphery with an annular pocket 30 having an annular recess 31 in its cylindrical side wall, and in which is frictionally engaged a brake band 32, having its end portions 33—33 turned inwardly and engaged in a pocket 34 of a circular wall flange 35 secured in an annular recess 36 in the upper side of the base plate 11. A helical compression spring 37 is positioned between the ends 33—33 of the brake band to maintain a predetermined frictional pressure upon the nut element 26. The brake band is adapted in the operation of the nut to impart rotation to the nut element 26 from rotation of the casing 10 when the resistance imposed by load upon the lower nut does not exceed the turning force of the brake band.

An upper nut element 38 is threaded upon the screw shaft in spaced relation above the lower nut element, and is mounted at its outer periphery within a cylindrical carrier member 39, having an annular recess 40 at its upper end within which an annular rim flange 41 of the upper nut engages. The carrier member is extended downwardly in concentric surrounding relation to the lower nut and has secured in an annular recess 42 in its lower side a horizontal ball race member 43 disposed above the outer set of balls 24. The upper nut element 38 is secured to the carrier member 39 by set screws 44, the arrangement permitting rotatable adjustment of the upper nut within the carrier, so that the phase of its screw threads engaged with the screw shaft may be accurately adjusted with respect to the screw threads of the lower nut element.

The upper nut element 38 is provided in its upper side at its inner periphery with an annular pocket 45 having an annular recess 46 in its cylindrical side wall, in which is engaged a brake band 47 having its inwardly turned end portions 48—48 engaged in a pocket 49 of a circular wall flange 50 secured in an annular recess 51 in the lower side of the cover plate 15, a helical compression spring 52 being positioned between the ends of the brake band. This brake band is similar in its construction and operation to the brake band 32 of the lower nut element, causing the upper nut element to turn with the casing 10 when the load resistance thereon does not exceed the turning force applied by the brake band.

The nut casing is supported by a ball bearing assembly 53 surrounding the screw shaft 27 and supported upon a base member 54 having a vertical passage 55 through which the screw shaft extends freely. The load to be lifted by the screw shaft is represented by a weight 56 engaged upon its upper end.

The operation of the invention will be clear from Fig. 4 wherein the cam races 21 and 22 of the circular cam ring are diagrammatically illustrated as a series of rising and falling inclined planes formed upon the upper surface of the circular base plate 11. Assume that the outer row of balls 24 is resting on the high points of the outer cam race 22, and the inner race of balls 23 is resting on the low spots of the inner cam race 21, and that the upper and lower nut elements are disposed upon the screw shaft 27, so that their ball races 43 and 29 respectively engage the outer and inner rows of balls. The inner row of balls is thus in position to roll upwardly upon the ascending parts of the inner cam race while the outer row of balls is in position to roll downwardly upon the descending parts of the outer cam race. Upon turning movement of the nut assembly in clockwise direction, that is, in the direction of the arrows 1, the inner row of balls disposed beneath the lower nut will roll upwardly upon the ascending portions of the inner cam race causing the lower nut to be jammed by its threads against the screw and thus held against rotation through the load resistance imposed thereon in excess of the frictional effort of the brake band 30, so that the latter will slide with respect to the lower nut. As the balls ride upwardly, the lower nut is lifted vertically, as indicated by the arrow 2 and is jammed against the threads of the screw, imparting a corresponding vertical lifting movement to the screw, as indicated by the arrow 3. In the meantime the outer row of balls, which is propelled with the inner row of balls through the restriction of the ball retainer will descend the falling portions of the outer cam race, and the upper nut which is thus released from any load will be enabled to turn freely upon the threads of the screw as indicated by the arrows 4 and 5, being carried along by the rotation of the casing through the action of the brake band 47. At the moment the ascending balls of the inner race reach the high point of the cam and the descending balls of the outer race reach the low points of the cam, the action will become reversed, and the nut which has just descended freely will start to rise up again and exert a thrust against the screw while the other released nut will descend without load. As the succession of rising and falling movements of the balls is continuous and the transition between the rising and falling movement is substantially instantaneous, the alternating thrusts upon the screw results in a substantially uniform and continuous thrust. Thus rotation of the casing over the length of the screw becomes transformed into an axial thrust on the screw, without there occurring any friction between the threads of the nut which supports the load, the nuts turning alternately over the screw only during the intervals when there is no load imposed thereon. Obviously the nut will operate in a similar manner if it is held stationary and the screw is caused to turn.

Because of the fact that the linear horizontal displacement or shifting of a ball is one-half of the linear displacement of the surfaces between which the ball rolls or moves, it is necessary that in order that the balls effect a complete turn around the screw that the casing make two turns. Thus, with a screw having a given pitch the axial advance will be one-half of this pitch for each turn of the nut. The nut, therefore, operates as a reduction gear having the advantage of permitting very small advance of the screw through multiplied movement of the nut, this reduction taking place when the nut is under load. When not under load, or where the load is of such a minimum order that the frictional resistance of the thread engagement is less than the turning force of the brake bands of the two nuts, the nut assembly will turn upon the screw in the manner of an ordinary nut and will, therefore, advance at a rate equal to the pitch of the screw, that is at twice the speed of its operation under load. This has advantages in many applications where the screw is not always under load, but is called upon to travel a certain distance before or after its normal load is reached.

Figure 3:
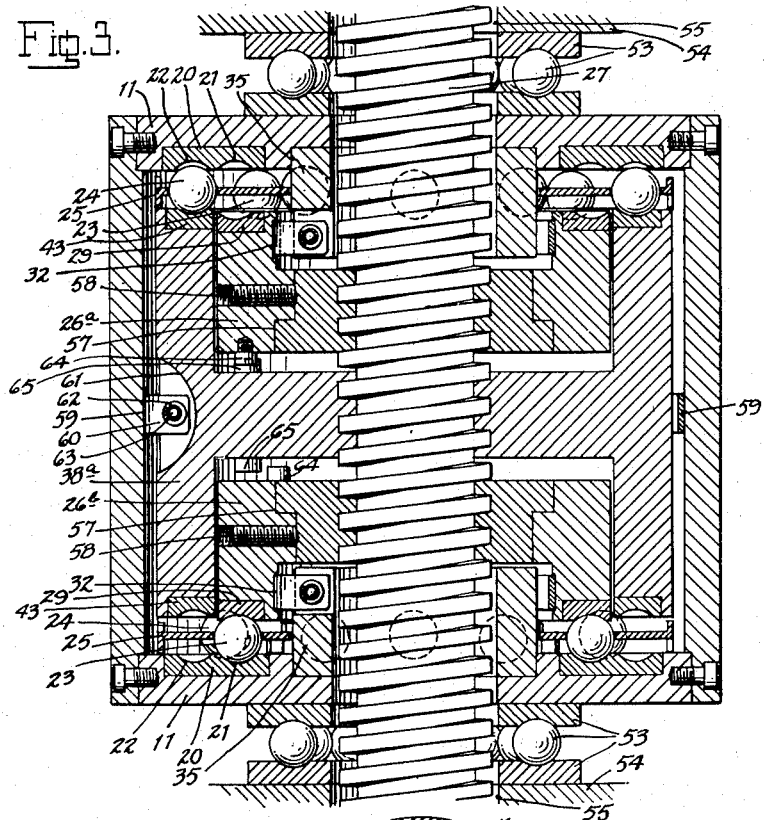
Fig. 3 is a vertical sectional view of a modified form of the invention adapted to apply force in either of two opposite directions.

The form of the invention illustrated in Figs. 1, 2 and 4 produces a thrust in one direction only. In Fig. 3 there is illustrated a modification of the invention which is adapted to produce a thrust in either of two opposite directions. This consists generally in providing within the nut assembly a duplication of the mechanism of the single thrust type of nut, the parts for operating in one direction being reversely disposed to the parts for operating in the other direction, so that by rotation in counter-clockwise direction tne nut will exert thrust in one direction and by rotation in clockwise direction the nut will exert thrust in the opposite direction.

The nut casing is substantially similar to the casing 10 of the single thrust nut, but is of somewhat greater length, and is provided in each of its ends with a cam supporting plate 11 similar to the base plate 11 of the single thrust nut, the cam ring 20, balls 23 and 24 and retainer 25 associated with each of the cam supporting plates being identical with those of the single thrust nut, and therefore having the same reference characters applied thereto. Upper and lower reversely disposed nut elements 26a and 26b are provided which substantially corresponds to the lower nut 26 of the single thrust nut, and which are each engaged in a similar manner by the brake band 32 carried upon the cylindrical wall flange 35 secured to each of the plates 11, the ball race ring 29 of the nut element 26a being opposed by the inner row of balls 23 at one end, and the ball race 29 of the nut element 26b being opposed by the inner row of the balls 23 at the other end. The nut elements 26a and 26b are each formed as two part assemblies divided along a stepped line 57 to permit relative rotational adjustment between the parts for the purpose of accurately adjusting the phases of their screw thread engagement with the screw shaft or spindle 27 in relation to the intermediate nut element presently to be described, the position of adjustment being fixed by set screws 58. Between the nut elements 26a and 26b there is provided an intermediate nut element 38a, substantially similar to the upper nut element 38 of the single thrust nut, its outer cylindrical wall portion being extended both upwardly and downwardly from its intermediate lateral portion and provided at its ends with ball races 43 respectively engaging the outer rows of balls 24 at each end of the nut assembly. The nut 38a is frictionally connected to the casing 10 by a brake band 59 engaging the cylindrical inner surface of the casing 10 and having its ends 60 turned inwardly and engaged in a pocket 61 formed in the nut element 38a, a helical compression spring 62 being disposed between the ends 60 and positioned by means of studs 63 provided upon the ends 60. The operation of this brake band is similar to the operation of the brake bands 32 for the nut elements 26a and 26b, slipping upon the casing 10 when load is applied to the nut element 38a, and carrying the nut element with the casing when the nut element 38a is relieved of load.

The nut casing is engaged at each end by a ball bearing assembly 53 surrounding the screw shaft 27 and supported against a fixed member 54 having a vertical passage 55 through which the screw shaft extends freely.

When the nut assembly is turned in clockwise direction to produce a lifting thrust upon the screw shaft, the nut element 26b is active, while the nut element 26a is inactive, and being under no load will be turned in clockwise direction with the casing. In order to prevent the inactive nut element from screwing down into tight engagement with the nut element 38a, stop lugs 64 and 65 are provided upon the opposed faces of the nut element 26a and nut element 38a, which will come into contact before the inactive nut can screw downwardly against the face of the nut element 38a, thus restricting the screwing down movement of the nut element 26a while still permitting relative raising and lowering movement of the nut element 38a. Similar studs 65 and 64 are provided upon the opposed lower face of the nut element 38a and the nut element 26b, and which operate in a similar manner when the nut assembly is being turned in counterclockwise direction to produce a downward pushing thrust upon the screw shaft, and nut element 26b is inactive.

Figure 5:
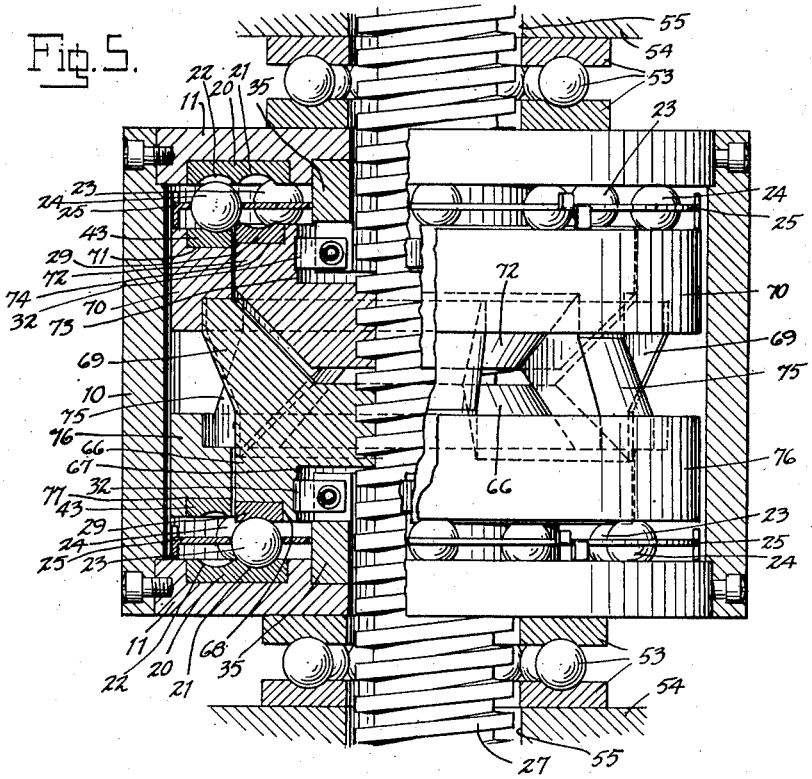
Fig. 5 is a vertical sectional view, partially in elevation, of another modification of the invention adapted to apply force in either of two directions.
Figure 6:
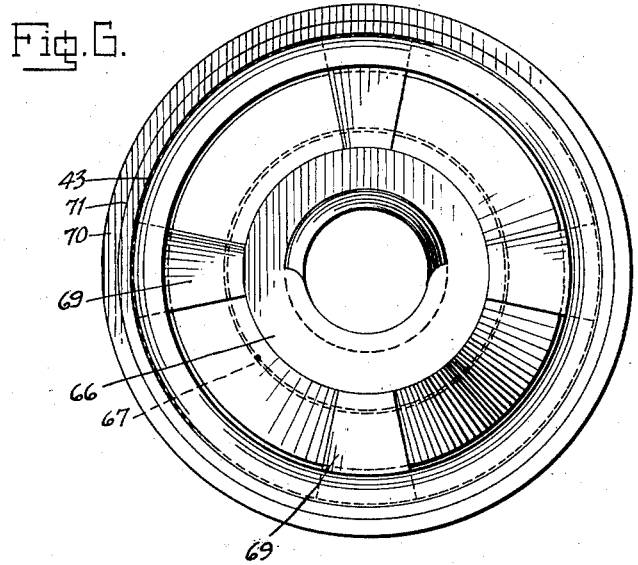
Fig. 6 is a detail plan view of one of the nut elements as employed in the structure illustrated in Fig. 5.

In Figs. 5 and 6 there is illustrated a modified form of nut assembly, also adapted for producing thrust in two opposite directions, and wherein two nut elements are employed instead of the three nut elements as provided in the form of the invention shown in Fig. 3. The casing 10 is provided with cam-carrying end plates 11 similar to the casing structure of the double thrust nut assembly shown in Fig. 3, being provided in a similar manner with cylindrical wall flanges 35 carrying brake bands 32 for cooperation with the two nut elements. The lower nut element 66 is provided with a cylindrical walled recess 67 in its lower end for engagement by the lower brake band 32 and has a ball race 29 secured in a recess 68 thereof in opposed relation to the inner row of balls 23 engaged with the lower cam race 20. A series of spaced arms 69 extend upwardly and outwardly from the upper side of the lower nut element 66 and support upon their upper ends a bearing ring 70 having a ball race 43 set in a recess 71 thereof in opposed relation to the outer row of balls 24 provided in relation to the upper cam ring 20.

The upper nut element 72 is of identical construction to the lower nut element but is in inverted relation thereof, a cylindrical walled recess 73 being provided in its upper side for engagement by the upper brake band 32, and a ball race 29 being set into a recess 74 in opposed relation to the inner row of balls 23 at the upper end of the nut assembly. A series downwardly and upwardly extending arms 75 have mounted upon their lower ends a bearing ring 76 having a ball race 43 secured in a recess 77 thereof in opposed relation to the outer row of balls 24 at the lower end of the nut assembly. The arms 75 of the upper nut element extend through the spaces between the arms 69 of the lower nut element with sufficient clearance between the arms to permit of the successive relative rotational movements of the nut elements with respect to each other. In this form of the invention the upper rows of balls are inactive during the clockwise movement of the nut assembly to produce upward thrust on the screw shaft, while the lower rows of balls are inactive during the counter-clockwise movement of the nut assembly to produce downward thrust upon the screw shaft.

As pointed out in the introduction, the parts making up the force amplifying nut of the invention are subject to elastic deformation or other dimensional change in the materials under load, and as one set of balls and its cooperating nut element is alternately under load while the other set of balls and its cooperating nut element is free of load, it follows that a dimensional difference results between the parts under load and the parts which are not under load, so that specifically the ball under load and its cooperating ball races may be said to be compressed and contracted, while the ball not under load and its cooperating ball races may be said to be free and expanded. In this latter case the ball race of the nut related to the free balls not under load is in fact disengaged with respect to the balls, and can, therefore, be aptly referred to hereinafter as the disengaged race.

The dimensional difference between the parts under load and the parts not under load will be referred to hereinafter as $c$, the value of $c$ representing such factors as the moduli of elasticity of the materials, the surface characteristics of the balls and races, the torque necessary to cause slippage of the brakes, and the applied load. As the relationship between the balls under load and the balls not under load becomes reversed the value of $c$ represents the vertical movement of the components of one ball race needed to transfer the load from one race to the other, including elastic deformation taking place during such transfer.

A further important consideration is the relationship between the amplitude of the cam, that is the vertical distance that rotation of the cam causes the balls to move and the pitch fraction of the screw segment traversed by the free nut during one half cycle. In the following explanation the amplitude of the cam will be referred to as $h$ and the pitch fraction will be referred to as $p$, the value of $p$ being the axial pitch of the screw, represented by P, divided by the total number of balls in the two races. For example, if the axial pitch of the screw is .250'', and there are 12 balls in each race or a total of 24 balls, the value of $p$ is .01041''. Three conditions may exist in this respect, that is the condition where the amplitude is greater than the pitch fraction, the condition where the amplitude equals the pitch fraction, and the condition where the amplitude is less than the pitch fraction, and as structural differences must exist in the nut to provide for its proper operation under these three conditions, a kinematic analysis chart is illustrated in the Fig. 7, showing graphically the relative travel of the two sets of balls and the cooperating nuts under these three conditions, the chart showing in the left-hand side the movement during opening of the nut for lowering the load through counter-clockwise movement of the nut assembly and cam, and the right-hand side showing the closing movement of the parts during raising of the load through clockwise movement of the nut assembly and cam. In this chart A represents the ball under load and $x$ its cooperating ball race and nut, B represents the free ball and $y$ represents its cooperating disengaged ball race and nut. The front or active face of the cam is represented by FF, and the back or inactive is represented by BF. The following is an index of the nomenclature and symbols employed in connection with the kinematic chart of Fig. 7:

*Nomenclature and symbols*

N=Total number of balls.
$n=N/2$=Number of balls per race.
$d$=Diameter of balls.
$r$=Radius of cross section of race groove.
$D_1$=Diameter of outer race.
$D_2$=Diameter of inner race.
$\theta=2\pi/n$=Angular distance between balls in same race=cycle length=movement of cam for one half cycle.
$\phi=\theta/2=\pi/n$=Angular distance between balls in inner and outer races=one half cycle.
FF=Front or active face of cam.
BF=Back or inactive face of cam.
$h$=Amplitude of cam.
P=Axial pitch of screw.
$P/n$=Axial travel of free nut due to threads during one cycle.
$P/n-h$=Net axial travel of free nut due to threads and cam in one cycle.
$p=P/2n$=Axial travel of free nut due to threads during one half cycle.
$S=hn/\pi$=Slope of FF.
$s=(P-hn)/\pi$=Slope of free movement of disengaged race re cam.
$c$=Vertical movement of components of one nut necessary to transfer the load from one race to the other, including elastic deformation. Value of $c$ depends on moduli of elasticity of materials, and other variable factors under load.

It has been found that while it is a very simple matter to cause the nut assembly to lift the load, the factors which come into play when the nut assembly is being operated to lower the load are substantially different, so that if compensation is not provided for such factors, a nut assembly that will operate to lift the load may not be able to function continuously to lower the same load, since the nut members, under some operating conditions, may shift to relative positions beyond the range of operative relationship to each other, as hereinafter described in more detail. In lowering, the load must be transferred alternately from one set of balls to the other and this transfer must take place within certain limits of time, which time is determined by the rotation of the cam carrying the inclined cam races.

Considering the left-hand chart showing the nut opening in lowering the load it is assumed that there are only two balls and two inclined planes. This assumption is permissible since multiplying of these various elements does not change the method of operation. In lowering, the cam is turned in counter-clockwise direction so that the nut and race $x$ associated with the ball A moving down the inclined plane is jammed against the threads of the screw and does not turn, while the disengaged race and nut $y$ associated with the ball B moving up the inclined plane is free and is rotated upwardly through its brake connection with the nut assembly. Now if the cam is moved in counter-clockwise direction to allow the ball A to descend the inclined plane of the active face of the cam represented as FF, the ball B will, because of the constraint of the ball retainer, climb the other inclined plane, that is the inactive face of the cam represented as BF. The satisfactory operation of this nut assembly in opening depends almost entirely upon the behavior of this ball B and the disengaged race $y$ above it, as the ball B and the disengaged race must sometime before the end of the cycle engage one another and take over the load from the ball A. Therefore, it is of a very great importance to examine and control the vertical travel of the disengaged race.

A consideration of what happens as ball A rolls down its inclined plane shows the following: The ball A, the race above it, and the screw shaft or spindle carrying the load will descend the vertical distance represented by $h$ as ball A moves from the top to the bottom of its inclined plane. The disengaged race $y$ above the ball B carries no load and can, therefore, be turned through its brake band connection to the nut assembly through an angle equal to the travel of the cam. This will cause the nut and consequently the race $y$ above ball B to rise an amount approximately equal to twice $p$. The net movement then of this disengaged race is up twice $p$, because of its rotation in the thread of the screw and down one $h$, because the entire screw shaft is descending due to the descent of the ball A carrying the load. If $h$ is equal to $p$ the net movement of this disengaged race will be up two $h$ and down one $h$, so that it will really be up one $h$. If $h$ is greater than $p$ its net movement will be up $p$ minus the amount which $h$ is greater, and if $h$ is less than $p$ its net movement will be $p$ plus the amount by which $h$ is less. In the case where $h$ is greater than $p$, and assuming that the inclined plane of the inactive face is of the same angularity as the active face, such as represented for instance by the dot-and-dash line in the upper section of the left-hand chart, the disengaged race $y$ will engage the ball and take over the load at a point considerably before it reaches the end of the cycle, and will cause the movement of the screw shaft to be reversed. This is represented by the point of intersection of the dash line with the dot-and-dash line.

Considering the specific case of a screw in which the pitch of the screw is .250", the number of balls in each race is 12 or a total of 24 balls, the value of $p$ is .01041", and the amplitude of the cam, or $h$, is greater than $p$, for instance .012", the following takes place: when the cam turns 30° or $2\pi/n$ representing the angular distance between the balls in the same race, A drops $h=.012"$, $x$ drops $h=.012"$, load drops $h=.012"$, B rises $h=.012"$, $y$ drops $h=.012"$ and screws up twice $p$ or .02083". The net movement of $y$ is therefore .00883" up. Thus when the inactive face of the cam is inclined as represented by the dot-and-dash line, $y$ will contact B before B reaches the crest when $c$ is less than .00316". The dash line indicating $c$ represents $c$ as less than .00316". A line representing $c$ as .00316" would be parallel to the dash line but would meet the crest represented at the point indicated by the numeral 3.

In order to correct for this condition, the inactive face BF of the cam is relieved by the triangular area prescribed by the numerals 1, 2 and 3, with the result that the ball B is prevented from premature contact with the disengaged race in opening, the point of engagement being just before the end of the cycle, that is at the point of movement of the ball B along the path between the points 2 and 3.

In Fig. 8 there is illustrated the profile shape of the relieved inactive face of the cam, represented as BF in the chart, the transition surfaces between the straight inclines being radiused. In the several embodiments of the invention hereinbefore described, the cam, in each case, has its inactive faces relieved substantially as shown in Fig. 8.

In Fig. 8a there is shown a modified profile shape in which the active face FF is of greater length than the inactive face BB. For example, where there are 12 balls in each race, with a 30° distance between the balls in the same race, the active face may be 16° and the inactive face 14°.

In the case where $h$ and $p$ are equal, and where $h$ is less than $p$, as shown in the middle and lower section of the left-hand chart, the upward net movement of the disengaged race $y$ is greater than the upward movement of the ball B, so that, without proper corrective means, the disengaged race will run away from the ball and will never contact it. Consequently it will never take over the load from the ball A. The corrective means for meeting this condition is to limit the angular movement about the screw shaft of the nut and the disengaged race $y$ with respect to the nut and the engaged race $x$. The moment this rotary movement about the screw is limited the disengaged race commences to descend with the movement of the screw shaft caused by the descent of the ball A. This movement can be limited at just the proper time to cause the disengaged race to come in contact with the ball B just before it reaches the top of its travel and it can then take over the load, pass over the crest, and the cycle can recommence with the ball B in the role of ball A, and the ball A in the role of ball B. The limiting means are indicated in the chart as stops.

The action during closing movement to raise the load is shown in the right-hand chart the load under each of the three conditions illustrated being transferred from the ball A to the ball B at a point slightly after the ball B reaches the trough of the cam.

Figure 9:
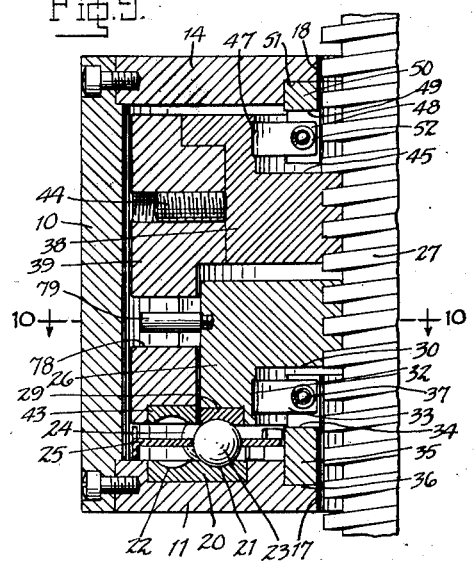
Fig. 9 is a fragmentary vertical sectional view of a nut assembly, similar to that illustrated in Fig. 1, in which stop means are employed according to another method of carrying out the invention.
Figure 10:
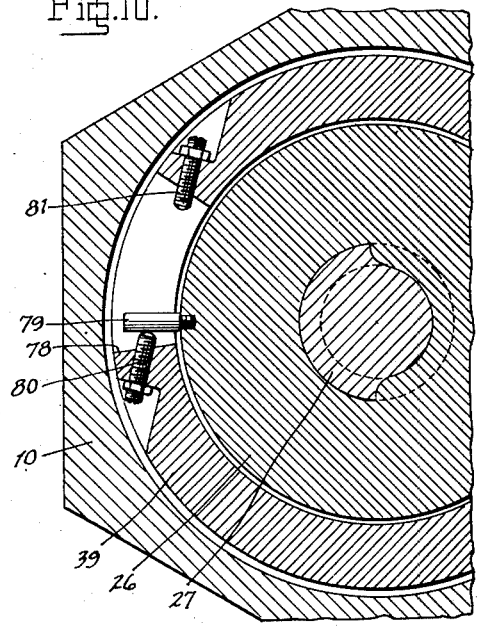
Fig. 10 is a horizontal sectional view, taken along the line 10—10 of Fig. 9.

In Figs. 9 and 10 the nut assembly of the type as illustrated in Figs. 1, 2 and 4 is shown as modified to provide stop means. This means consists in providing a slot opening 78 in the wall of the nut element 38 engaged by a pin 79 secured to the nut element 26, adjustable stop screws 80 and 81 being provided in the end walls of the slot for contact with the pin 79 in the desired predetermined time relation.

Figure 11:
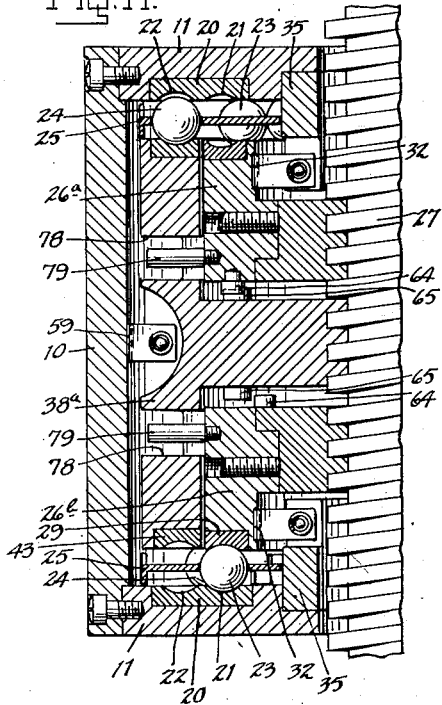
Fig. 11 is a fragmentary vertical sectional view of a nut assembly, similar to that illustrated in Fig. 3, in which stop means are employed.

In Fig. 11 the double acting nut of the type illustrated in Fig. 3 is shown modified by similar stop means to those shown in Figs. 9 and 10, the nut element 38a having two such slots 78 provided with adjustable stop screws 80 and 81 for respective engagement by two pins 79 respectively secured to the nut elements 26a and 26b.

Figure 12:
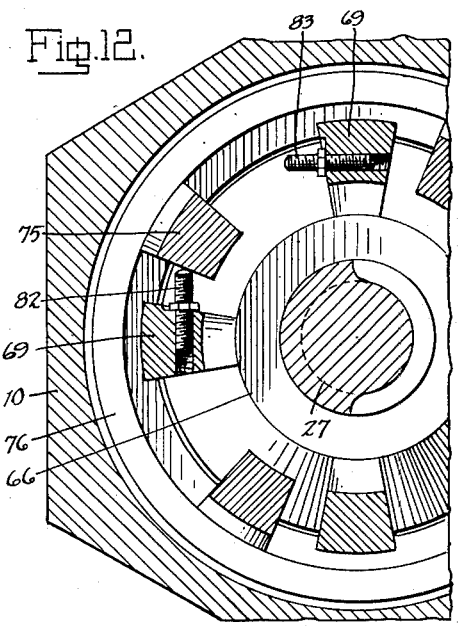
Fig. 12 is a fragmentary sectional plan view of a nut assembly, similar to that illustrated in Fig. 5, in which stop means are employed.

In Fig. 12 a double acting nut assembly of the type illustrated in Figs. 5 and 6 is shown modified to provide stop means, such stop means consisting of adjustable stop screws 82 and 83 provided in two of the arms 69 of the lower nut element for engagement by one of the arms 75 of the upper nut element engaged therebetween.

What is claimed is:

1. A force applying device of the character described, having in combination a movably mounted force applying member, a rotary cam mechanism having angularly displaced oppositely inclined cam portions providing peak portions therein, rotatably mounted threaded members interposed between said force-applying member and said cam mechanism, roller members acting between said cam mechanism and said threaded members, said rollers being positioned to shift the force applied between said cam mechanism and said force applying member upon rotation of the cam mechanism, successively from one threaded member to the other as the oppositely inclined portions of the cam mechanism shift angularly in position with respect to said roller and threaded members, motion transmitting devices acting between said cam mechanism and threaded members upon rotation of the cam mechanism, to impart angular movement to one threaded member while the other threaded member is in the force-applying relation above referred to, said force-applying device being constructed and arranged to limit the last mentioned angular movement to an amount which will shift the force applied between the cam mechanism and the force applying member from one threaded member to the other as aforesaid, at a point somewhat angularly displaced from the peak portions of said cam mechanism.

2. A force-applying device of the character described, having in combination a movably mounted force-applying member, a rotary cam mechanism having angularly displaced oppositely inclined cam portions providing peak portions therein, rotatably mounted threaded members interposed between said force-applying member and said cam mechanism, roller members acting between said cam mechanism and said threaded members, said rollers being positioned to shift the force applied between said cam mechanism and said force-applying member upon rotation of the cam mechanism, successively from one threaded member to the other as the oppositely inclined portions of the cam mechanism shift angularly in position with respect to said roller and threaded members, motion transmitting devices acting between said cam mechanism and threaded members upon rotation of the cam mechanism, to impart angular movement to one threaded member while the other threaded member is in the force-applying relation above referred to, said force-applying mechanism having stop devices acting between said threaded members to afford angular movement of one threaded member relative to the other as aforesaid but limiting such angular movement to an amount which will shift the force applied between the cam mechanism and the force-applying member from one threaded member to the other as aforesaid, at a point somewhat angularly displaced from the peak portions of said cam mechanism.

3. A force-applying device of the character described, having in combination a movably mounted force-applying member, a rotary cam mechanism having angularly displaced oppositely inclined cam portions providing peak portions therein, rotatably mounted threaded members interposed between said force-applying member and said cam mechanism, roller members acting between said cam mechanism and said threaded members, said rollers being positioned to shift the force applied between said cam mechanism and said force-applying member upon rotation of the cam mechanism, successively from one threaded member to the other as the oppositely inclined portions of the cam mechanism shift angularly in position with respect to said roller and threaded members, motion transmitting devices acting upon rotation of the cam mechanism, to impart angular movement to one threaded member while the other threaded member is in the force-applying relation above referred to, certain of said inclined cam portions being shaped to cause the force applied between the cam mechanism and the force-applying member to be shifted from one threaded member to the other at a point somewhat angularly displaced from the peak portions of said cam mechanism.

4. In a force amplifying device, a threaded spindle, annular cam means encircling said spindle, said cam means including two circular cam races concentric with said spindle, a plurality of axially facing cam sections in each cam race, the cam sections in each race being substantially similar, each cam section comprising two angularly related cam surfaces, one of said cam surfaces being inclined in the same direction as the threads of the spindle, the said inclined cam surfaces being longer than the other cam surfaces, a plurality of rolling members in each cam race, the number of rolling members in each race being not less than three nor more than the number of cam sections in such cam race, means for spacing the rolling members equally around each cam race with the rolling means in one cam race at positions relative to the cam sections in that race at predetermined relation to the positions of the rolling members in the other cam race relative to the cam sections in such other cam race, two nuts threaded on said spindle, one nut having a surface for engaging the rolling members in one cam race, the other nut having a surface for engaging the rolling members in the other cam race, means for limiting the axial movement of each nut along the spindle relative to the other nut to an amount not exceeding the maximum axial height of said cam sections.

5. A force amplifying device having a threaded spindle, nut members having threaded relation with respect to said spindle, a cam having means mounting the same to afford rotary movement thereof in opposite directions relative to said spindle to respectively tighten and loosen said device, said cam having successive axially directed peak and valley portions substantially concentric with said spindle, rollers coacting with said cam portions and nut members to shift force applied between said cam and spindle successively from one nut member to the other, upon rotary movement of said cam in either direction, motion transmitting devices acting between said cam and nut members to impart angular movement and consequent axial movement to one nut member relative to the other while the other nut member is in the force applying relation above referred to, said force amplifying device including means constructed and arranged to afford relative axial movement between the nut members during rotary movement of said cam in the loosening direction aforesaid but to limit such relative axial movement to an amount not exceeding the maximum axial height of the peak portions of said cam, during rotary movement of said cam in the loosening direction aforesaid.

6. A force amplifying device having a threaded spindle, nut members having threaded relation with respect to said spindle, a cam having means mounting the same to afford rotary movement thereof in opposite directions relative to said spindle to respectively tighten and loosen said device, said cam having successive axially directed peak and valley portions concentric with said spindle, rollers coacting with said cam portions and nut members to shift force applied between said cam and spindle successively from one nut member to the other, upon rotary movement of said cam in either direction, motion transmitting devices acting between said cam and nut members to impart angular movement and consequent axial movement to one nut member relative to the other while the other nut member is in the force applying relation above referred to, said force amplifying device having stop means acting between said nut members to afford angular movement and consequent axial movement of one nut member relative to the other during rotary movement of said cam in the loosening direction aforesaid, but said stop means being constructed and arranged to limit such relative axial movement between the nut members to an amount not exceeding the maximum axial height of the peak portions of said cam, during rotary movement of said cam in the loosening direction aforesaid.

GEORGE GAYNOR HYDE.

REFERENCES CITED

The following references are of record in the file of this patent:

UNITED STATES PATENTS

| Number | Name | Date |
|---|---|---|
| 2,151,094 | Fiorentino | Mar. 21, 1939 |

FOREIGN PATENTS

| Number | Country | Date |
|---|---|---|
| 800,260 | France | Apr. 27, 1936 |